United States Patent

Lalikos et al.

[11] Patent Number: 5,361,806
[45] Date of Patent: Nov. 8, 1994

[54] KEVLAR REINFORCED HIGH PRESSURE HOSE ASSEMBLY WITH GRIP AND ENVIRONMENTAL BARRIER

[75] Inventors: James M. Lalikos, Agawam, Mass.; Norman H. Desilets, Enfield, Conn.

[73] Assignee: Titeflex Corporation, Springfield, Mass.

[21] Appl. No.: 909,703

[22] Filed: Jul. 7, 1992

[51] Int. Cl.⁵ .............................................. F16L 11/10
[52] U.S. Cl. ........................ 138/109; 138/125; 138/129; 138/153; 138/DIG. 3
[58] Field of Search ............... 138/109, 124, 125, 129, 138/123, 147, 153, DIG. 3; 285/14, 90, 149

[56] References Cited

U.S. PATENT DOCUMENTS

| | | | |
|---|---|---|---|
| 2,220,785 | 11/1940 | Goodall | 285/149 |
| 2,290,776 | 7/1942 | Stillwagon Jr. | 285/236 |
| 2,783,173 | 2/1957 | Walker et al. | 138/DIG. 3 |
| 2,787,289 | 4/1957 | Press | 138/125 |
| 3,140,884 | 7/1964 | Brauck | |
| 3,531,143 | 9/1970 | Horvath | 285/149 |
| 3,857,415 | 12/1974 | Morin et al. | 138/125 |
| 4,142,554 | 3/1979 | Washkewicz et al. | 138/125 |
| 4,156,540 | 5/1979 | Currie | |
| 4,567,916 | 2/1986 | Antal et al. | 138/109 |
| 4,614,206 | 9/1986 | Mathison et al. | 138/93 |
| 4,649,960 | 3/1987 | Policelli | 138/109 |
| 4,850,395 | 7/1989 | Briggs | 138/30 |
| 5,052,444 | 10/1991 | Messerly | 138/125 |

FOREIGN PATENT DOCUMENTS

| | | | |
|---|---|---|---|
| 0294181 | 12/1990 | European Pat. Off. | |
| 801044 | 9/1955 | United Kingdom | |
| 0948439 | 2/1964 | United Kingdom | 138/109 |
| 1497603 | 1/1978 | United Kingdom | |
| 2070725 | 9/1981 | United Kingdom | |

Primary Examiner—Timothy F. Simone
Assistant Examiner—James F. Hook
Attorney, Agent, or Firm—Louis Bernat

[57] ABSTRACT

A high pressure (up to 8000 psi service) hose assembly has an inner core made of "Teflon" PTFE, covered by a "Kevlar" aramid reinforcing braid. The PTFE can, but the aramid cannot, withstand the attack of oils and other fluids which may be conveyed through the hose. Therefore, the aramid is covered by PTFE tape and the end of the hose is sealed inside an end fitting. In one embodiment, when the end fitting is swaged or otherwise manipulated to capture the hose, the PTFE inner core extrudes to complete the sealing of the hose end.

25 Claims, 1 Drawing Sheet

KEVLAR REINFORCED HIGH PRESSURE HOSE ASSEMBLY WITH GRIP AND ENVIRONMENTAL BARRIER

This invention relates to high pressure hose assemblies, and especially—although not exclusively—to hoses which must be protected from their surrounding environment, such as oils and hydraulic fluids.

There are many times and places where high pressure hoses are required in any of a number of hostile environments. For example, high pressure hoses are required on vehicles ranging from submarines, through the automotive, to vehicles traveling to the outer space limits. In any of these or similar uses, the hose may encounter a wide spread of temperatures, mechanical shocks, jolts and vibrations. Another characteristic of such hoses is that they should have a very light weight. For example, there are estimates that every pound added to an aircraft requires at least seven additional pounds (added structural strength, more powerful engines, greater fuel requirements, etc.) Also, in any of these or similar uses, a hose failure could cause a catastrophic disaster.

Therefore, it is a common practice to provide a very light weight but extremely strong mechanical reinforcement surrounding the hose in order to help it to withstand internal pressure. Especially in airborne or other systems where weight is critical and where operational fluids can be very corrosive and damaging to high-strength, lightweight, flexible reinforcements, a hose of high strength-to-weight ratio must provide protection to the reinforcement without adding a burdensome cost or weight. Thus, it is imperative that the reinforcement have a high strength-to-weight ratio, and provide protection without adding burdensome costs, weight, or an enlarged profile or envelope.

One material (aramid) which meets these needs and specifications is manufactured and sold by the E.I. Du Pont de Nemours and Company, under the trademark "Kevlar". A "Kevlar" braided hose meets the SAE specifications AS1975. However, the "Kevlar" aramid material also has problems since it loses its strength when exposed to oils or hydraulic fluids. When this loss of strength occurs, the internal pressure may blow the end fittings off the hose, for example.

In its Bulletin K-4, August 1979, Du Pont describes "Kevlar" as follows:

KEVLAR aramid is an organic fiber . . . within the family of aromatic polyamides. KEVLAR has a unique combination of high strength, high modulus, toughness, and thermal stability which provides . . . for increasing the strength . . . or reducing the weight of reinforcement for . . . mechanical rubbergoods. Due to the distinct and different chemical composition and properties of aromatic polyamides, the Federal Trade Commission established the generic fiber classification, aramid to distinguish these fibers from other man-made fibers.

Typical properties for unscoured yarn samples of "Kevlar" are shown in Table I.

TABLE I

| TYPICAL PROPERTIES OF KEVLAR ® ARAMID YARN | |
|---|---|
| Denier (dtex) | 1500* |
| | (1670) |
| Number of Filaments | 1000 |
| Specific Gravity | 1.44 |
| Moisture Regain (commercial), % | 7.0 |

TABLE I-continued

| TYPICAL PROPERTIES OF KEVLAR ® ARAMID YARN | |
|---|---|
| Stress-Strain Properties | |
| Straight tests on conditioned yarn | |
| Breaking strength, lbs (daN) | 72.8 |
| | (32.3) |
| Breaking tenacity, gpd (cN/tex) | 22.0 |
| | (194.2) |
| Elongation at break, % | 3.6 |
| Initial modulus, gpd (cN/tex) | 525 |
| | (4636) |
| Loop tests on conditioned yarn | |
| Breaking strength, lbs (daN) | 70.0 |
| | (31.1) |
| Breaking tenacity, gpd (cN/tex) | 10.5 |
| | (92.7) |
| Elongation at break, % | 2.3 |
| Thermal Properties | |
| Strength loss, %, after 48 hours in dry air at 350° F. (177° C.) | 16 |
| Shrinkage, %, in dry air at 320° F. (160° C.) | 0.2 |
| Zero-strength temperature**, °F. (°C.) | 850 |
| | (455) |
| Half-strength temperature, °F. (°C.) | 750 |
| | (400) |
| Specific Heat cal/g/C. at 25° C. (J/kg · K) | 0.4 |
| | (1.6376 × $10^3$) |
| Thermal conductivity BTU/hr/ft$^2$/°F. per inch of thickness (W/m · K) | 0.3 |
| | (0.0144) |

*Other deniers (dtex) are also produced.
**Temperature at which the yarn breaks under a load of 0.1 g/denier (0.88 cN/tex).

This Table shows that "Kevlar" aramid yarn has:

1. A breaking tenacity of 22.0 grams/denier (194.2 cN/tex) which is more than five times as strong as steel wire and twice as strong as industrial yarns of nylon, polyester or fiberglass as used in mechanical rubber goods;

2. An unusually high initial modulus of 525 grams/denier (4636 cN/tex), which is about twice the modulus of steel wire, four times the modulus of high tenacity polyester and nine times the modulus of high tenacity nylon;

3. Excellent thermal stability (retains 84% of its strength after 48 hours in dry air at 350° F. or 177° C.).

Accordingly, an object of this invention is to provide new and improved high pressure hoses, especially—but not exclusively—for use in hostile environments. Here, an object is to provide hoses which may withstand up to at least 8000 psi internal pressure. In particular, an object is to provide such hoses for use in environments where oil or hydraulic fluids are prevalent.

In keeping with an aspect of the invention, these and other objects are accomplished by a use of a "Teflon" or PTFE inner core having "Kevlar" braid wrapped around it. To protect the "Kevlar" braid from oil and other destructive fluids, "Teflon" tape is wrapped over it. However, care is also taken to prevent the "Teflon" from being used in places, such as between a hose and fitting, where it may act as a lubricant and enable an end fitting, or the like, to blow off the end of the hose. Thus, the inventive high pressure hose assembly is for use in applications that must protect the reinforcement from exposure to detrimental fluids or other media that are being conveyed within the hose or to external media used to service the surrounding fluid system or from accidental spills in the proximity of the hose being protected.

A preferred embodiment is shown in the attached drawings, wherein.

The invention provides a hose assembly especially for use on systems having pressures up to 8000 psi. The innerliner of the hose is made of PTFE ("Teflon") or a similar extruded tubing. The reinforcement for the innerliner is made of high tensile "Kevlar" aramid yarn covered by a wrap of PTFE tape. This tape is, in turn, protected by a suitable braided chafe guard.

Figure 1:
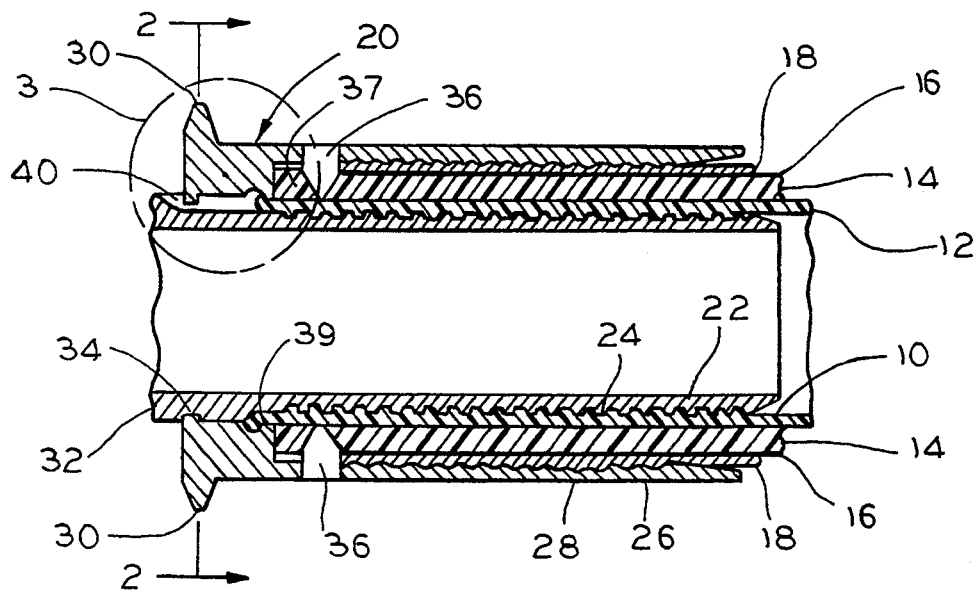
FIG. 1 is a longitudinal cross section of the inventive hose and end fitting.

As best seen in FIG. 1, the hose 10 comprises a "Teflon" or PTFE inner core 12 surrounded by a "Kevlar" braid 14. The "Teflon" inner core 12 carries and contains any oil or other fluid within the hose and resists any attack upon the "Kevlar" from within the hose. The "Kevlar" braid provides mechanical strength to prevent the hose from rupturing under great internal pressure.

However, the "Kevlar" will lose its strength if it encounters either oil or other similar contaminants. Therefore, to protect the "Kevlar" braid from an outside attack by oil or any other environmental contaminant, a relatively thin "Teflon" or PTFE tape 16 (shown by a heavily inked line) is wound or wrapped around the "Kevlar". The tape 16 can be helically wrapped, with 10% to 75% overlap with approximately a 50% overlap preferred, along the axis of the hose. Alternatively, it can be axially wrapped longitudinally, with an overlap in the order of 10% to 100%, with approximately 50% preferred. In some cases, both helical and axial wrap may be used. Greater overlaps can also be used, but they are not usually necessary. The thickness of the tape can be in the order 0.001 to 0.015 inches. The material selected for any given hose assembly can vary based on the fluids and temperature which are to be encountered.

The PTFE liner and tape wrap are preferred for general purpose use. It is possible that, for specific fluids such as lube oil or gasoline, a less expensive plastic such as nylon or high-density polyethylene or the like would be suitable in lieu of PTFE.

A braided chafe sleeve 18 of any suitable material is placed around the "Teflon" tape. Thus, any abrasion encountered by the hose is expended upon the protective braid 18.

The end fittings for this assembly may be made of any suitable material such as stainless steel, titanium, aluminum, high-strength plastic or a composite or of combinations of these materials. The design of the fittings provides a full gripping strength upon the hose, while at the same time allowing fluid to escape through the hose to fitting joint without contacting the reinforcement in the hose to fitting joint if and when imperfections of the fitting or poor assembly practice allows such leakage to take place in service. That is, no oil in the hose is allowed to contaminate the "Kevlar", even if it should leak at the joint between the end fitting and the hose. If the "Kevlar" reinforcement within the fitting joint is degraded by an exposure to a damaging fluid media, a catastrophic blow-off of the end fitting may be imminent.

The end fitting 20 may comprise a metal insert 22 having a number of threads, ribs, ridges or barbs 24 for engaging the inside surface of the inner core 10. An outer collar 26 fits over the braided chafe sleeve 18. The inside surface of collar 26 also had threads, ribs, ridges or barbs 28 for engaging and gripping sleeve 18. If made of metal, collar 26 is swaged or crimped to compress, entrap and seize the chafe sleeve 18, "Teflon" tape 16, "Kevlar" braid 14 and "Teflon" inner core 12. If made of plastic so that the end fitting cannot be crimped, a combination of doglock and sliding locking collar may be used as taught by co-pending U.S. patent application Ser. No. 07/708,780, filed May 29, 1991, now U.S. Pat. No. 5,140,738, issued Aug. 25, 1992.

Figure 2:
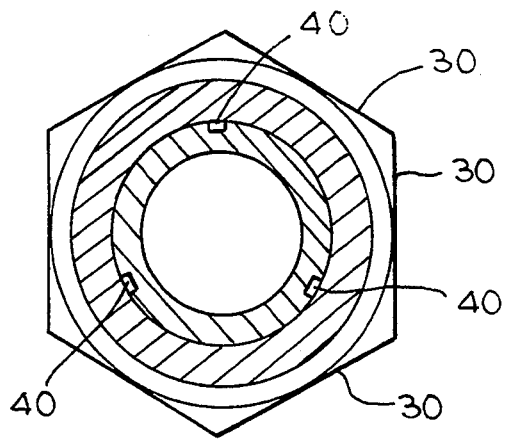
FIG. 2 is a cross section taken along line 2—2 of FIG. 1.

The proximate end of collar 26 has a plurality of wrench faces 30 (FIG. 2). The proximate end 32 of insert 22 may have any suitable connector for making any suitable attachment to another device. Thus, wrench faces 30 may be gripped while the connector engages an associated fitting.

A suitable complementary enlargement and depression combination 34 provides a dog lock between the insert 22 and the enlarged end of the collar 26. Any suitable number (such as four) of set screws 36, carried by the outer collar 28, are adapted to bite into and hold the "Kevlar" braid. The set screws may be located almost any place along the length of the collar, but they must be at least one-quarter inch from both the hose end 37 and the shoulder stop 39 of the collar against which the hose end rests, in order to avoid excessive stress at the ends of the collar and to properly lock the "Kevlar" aramid braid without causing the ends of the braid to fray and lose their gripping strength. The set screws 36 are normally required for large bore (1" diameter and larger) hoses, although they may sometimes also be used on smaller diameter hoses, especially for use at very high pressure.

The set screws are designed to penetrate between approximately 25% and 85% of the reinforcement layer thickness and to be recessed below the outside surface of the collar before swaging. The preferred penetration through the "Kevlar" aramid layer thickness is 60%. During swaging or crimping, the cold flow of a metal collar automatically stakes the set screws into position so that they cannot back out. When an all plastic end fitting is used, hose clamps are used to compress the hose while a locking collar is slipped into place. As the clamps are released this memory of the compressed hose presses outwardly to capture the locking collar and to entrap the set screws. After being locked in place, the outer surface of the set screws must be sealed using commercially available comparable sealing materials, such as wax, to prevent contamination of the reinforcement through the threaded collar where the screws are attached.

Figure 3:
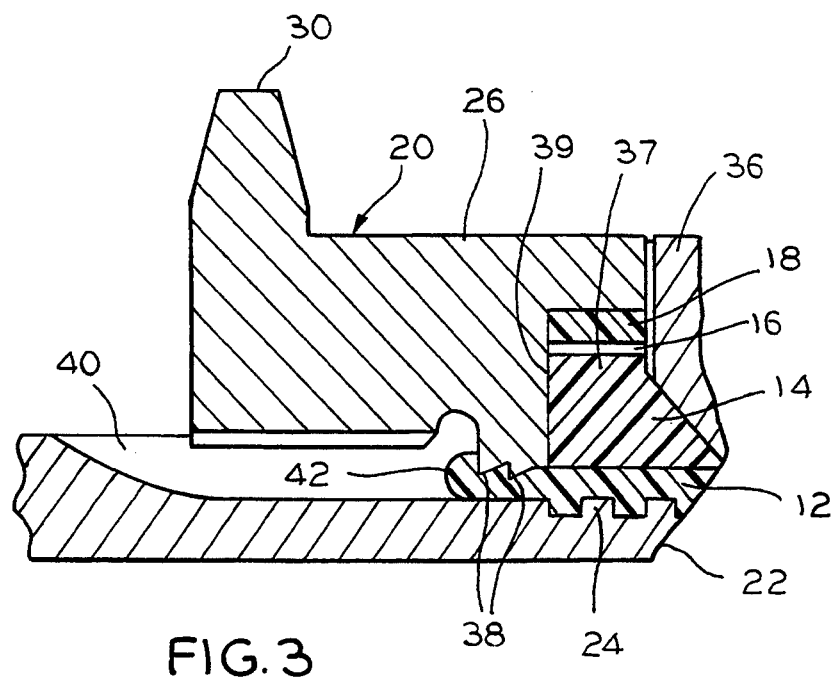
FIG. 3 is an enlarged cross section of the part of FIG. 1 that is enclosed by a dashed line circle 3.

The hose end 37 is inserted into the collar 26 until it bottoms on a shoulder stop 39 at the end of the collar counterbore. Then, the locking set screws 36 or similar devices are used to penetrate the "Kevlar" aramid reinforcement braid in as many places as are needed (in one case four places) to help hold the hose in place within the fitting. The end fitting holds securely with end loads up to 20,000 pounds and higher for one and one-quarter inch diameter hoses. The collar also has sealing barbs 38 (FIG. 3) which seal onto the "Teflon" innercore if it extrudes (as at 42) beyond the shoulder stop after the swedging to compress the collar onto the hose and insert. The extruded "Teflon" inner core seals the "Kevlar" at end 37 inside a chamber bounded by the extrusion and the shoulder of the collar.

The insert 22 has vent slots 40 through the portion where it joins the collar. Working together, the sealing barbs 38 and the extrusion of "Teflon" inner core 12 assure that if there is any leakage between the outside diameter of the insert 22 and the inside diameter of the hose, the leakage will exit via vent slots 40. There will not be a flow-back which will wet the "Kevlar" aramid reinforcement. Thus, the vent slots 40 allow the leaking fluid to flow out of the fitting without degrading the "Kevlar" reinforcement but provide visual evidence that there is a need for maintenance and service.

Those who are skilled in the art will readily perceive how the principles set forth above may be modified and adapted. Therefore, the appended claims are intended to cover all equivalent structures falling within the scope and the spirit of the invention.

The claimed invention is:

1. A high pressure hose assembly comprising an inner core of material which withstands an attack by media conveyed through the hose, a layer of mechanically strong aramid yarn reinforcing material surrounding said inner core, said aramid yarn reinforcing material being subject to attack by said conveyed media or by media likely to be encountered in the environment in which said hose assembly may be used, an outer layer of attack-resistant material completely surrounding and encasing said aramid yarn reinforcing material, said outer layer being a tape made of a material taken from a group consisting of PTFE, nylon and high-density polyethylene, said tape being wrapped around and encasing said aramid yarn, a chafe sleeve covering said outer layer, and an end fitting, said end fitting having a shoulder stop against which an end of said hose abuts, said shoulder stop cooperating with said inner core and said outer layer to completely encase said aramid yarn to protect the end of said hose from said conveyed media and said media in the environment.

2. The hose assembly of claim 1 wherein said inner core is made of a material taken from a group consisting of PTFE, nylon and high-density polyethylene.

3. The hose of claim 1 wherein said tape is PTFE applied by a helical wrap with 10% to 75% overlap between adjacent turns of said helical wrap.

4. The hose of claim 1 wherein said tape is PTFE applied by a helical wrap with approximately 50% overlap between adjacent turns of said helical wrap.

5. The hose of claim 1 wherein said tape is PTFE applied by an axial wrap having a longitudinal overlap in the order of about 10% to 100%.

6. The hose of claim 5 and at least one set screw in said end collar for locking said end fitting to said aramid yarn reinforcing material, said compression of said collar staking said set screw in place and sealing any space between the collar and set screw.

7. The hose of claim 5 and at least one set screw in said end fitting for locking said end fitting to said aramid yarn reinforcing material.

8. The hose of claim 5 wherein said end fitting is made of metal and said collar is swaged to capture the hose.

9. The hose of claim 8 and at least one set screw for attaching said end fitting to said hose, and sealing means applied to an outside surface of said set screw for preventing a loosening of said set screw.

10. The hose of claim 5 wherein said end fitting is made of plastic which cannot be swaged, said hose being an elastomeric with a plastic memory, said end fitting being captured by an expansion of the elastomeric hose as it pushes outwardly against said end fitting responsive to the elastomeric plastic memory.

11. The hose of claim 10 and at least one set screw for attaching said end fitting to said hose, and sealing means applied to an outside surface of said set screw for preventing a loosening of said set screw.

12. The hose of claim 1 wherein said tape is PTFE applied by an axial wrap having a longitudinal overlap in the order of 50%.

13. The hose of claim 7 wherein at least one set screw is located at least one-quarter inch from said shoulder stop and an end of said end fitting.

14. The hose of claim 12 wherein at least one set screw penetrates said reinforcing material by a distance in the range of about 25% to 85% of its thickness.

15. The hose of claim 12 wherein at least one set screw penetrates said reinforcing material by a distance of approximately 60% of its thickness.

16. The hose of claim 1 wherein at least one set screw is located at least one-quarter inch from both said shoulder stop and an end of said end fitting.

17. The hose of claim 1 wherein at least one set screw penetrates said reinforcing material by a distance in the range of about 25% to 85% of its thickness.

18. The hose of claim 1 wherein at least one set screw penetrates said reinforcing material by a distance of approximately 60% of its thickness.

19. A high pressure hose assembly comprising an end fitting including an insert and a collar, said insert and collar having a space between them closed by a shoulder stop, means for mechanically locking together said insert and collar, a multi-ply hose bottomed against said shoulder stop and captured between said insert and collar, said multi-ply hose comprising a PTFE inner core surrounded by aramid braid and covered by PTFE tape, means for sealing an end of said multi-ply hose in said space defined by said insert, collar, and shoulder stop, said collar being captured against said insert to capture said multi-ply between them, said PTFE inner core extruding responsive to said capture to provide said sealing means, and vent means for expelling any fluid leaking from said hose at said end fitting without wetting said aramid braid sealed within said space, said vent means being positioned to be sealed by said extruding inner core to prevent a back-flow of said leaking fluid toward said aramid braid.

20. The hose assembly of claim 19, wherein said collar is captured against said insert to capture said multi-ply between them, said PTFE inner core extruding responsive to said capture to provide said sealing means.

21. The hose assembly of claim 20 and a chafe braid surrounding said PTFE tape for protecting said tape against mechanical abrasion.

22. The hose of claim 19 and serrations on at least one of said collar and insert for seizing said extruded PTFE inner core.

23. The hose of claim 19 wherein said outer layer is a thin wall tube.

24. The hose of claim 19 wherein said inner core is a fluorocarbon material.

25. The hose of claim 19 wherein said outer material is a fluorocarbon material.

* * * * *